United States Patent
Schotthoefer

Patent Number: 6,164,100
Date of Patent: *Dec. 26, 2000

[54] DEVICE FOR SECURING A SPARE TIRE

[75] Inventor: Gerald R. Schotthoefer, Dallas, Tex.

[73] Assignee: Adell Corporation, Sunnyvale, Tex.

[*] Notice: Under 35 U.S.C. 154(b), the term of this patent shall be extended for 720 days.

[21] Appl. No.: 08/516,516

[22] Filed: Aug. 17, 1995

Related U.S. Application Data

[63] Continuation of application No. 08/321,582, Oct. 11, 1994, abandoned, which is a continuation of application No. 08/151,949, Nov. 15, 1993, abandoned.

[51] Int. Cl.$^7$ .................................................. B62D 43/04
[52] U.S. Cl. ........................ 70/259; 224/42.21; 414/463
[58] Field of Search ................ 70/14, 158, 225, 70/234, 258, 260; 414/463; 224/42.06, 42.21, 42.23, 42.25

[56] References Cited

U.S. PATENT DOCUMENTS

| | | | |
|---|---|---|---|
| 4,526,021 | 7/1985 | Princell | 70/259 X |
| 4,988,023 | 1/1991 | Heathcoat | 70/259 X |
| 5,077,995 | 1/1992 | Appelbaum | 70/259 |
| 5,199,287 | 4/1993 | McClary | 70/259 |
| 5,211,043 | 5/1993 | Langdon | 70/259 |
| 5,343,722 | 9/1994 | Richardson | 70/259 |
| 5,426,963 | 6/1995 | Tafoya et al. | 70/259 |

*Primary Examiner*—Suzanne Dino Barrett
*Attorney, Agent, or Firm*—Timmons & Kelly

[57] ABSTRACT

A locking shaft extends from the end of the hoist shaft through the hole in the rear bumper of a vehicle. The front end of the locking shaft is tapered to fit within the end of the hoist shaft. A padlock fits within a hole in the locking shaft adjacent to the bumper. The padlock prevents unauthorized removal of the locking shaft from the hoist shaft. If the locking shaft and the hoist shaft are rotated, the padlock contacts a lip on the bumper and prevents further rotation of the locking shaft and the hoist shaft.

8 Claims, 2 Drawing Sheets

6,164,100

DEVICE FOR SECURING A SPARE TIRE

This application is a continuation of application Ser. No. 08/321,582, filed Oct. 11, 1994, abandoned, which is a continuation of application Ser. No. 08/151,949, filed Nov. 15, 1993, now abandoned.

BACKGROUND OF THE INVENTION

1. Field of the Invention

This invention relates in general to security devices for securing spare tires. In particular, the invention relates to security devices for securing a spare tire mounted on a hoist having a hoist shaft accessible through an opening in the bumper.

2. Description of Related Art

U.S. Pat. No. 5,199,287, issued Apr. 6, 1993, to McClary, shows a device for securing a spare tire mounted on a hoist having a hoist shaft accessible through an opening in the bumper. The device includes a locking shaft extending from the end of the hoist shaft to the opening in the bumper. The device also has a padlock inserted through a hole in the locking shaft for preventing the removal of the locking shaft from the hoist shaft.

U.S. Pat. No. 5,077,995, issued Jan. 7, 1992, to Appelbaum, discloses another device for securing a spare tire. The device includes a locking shaft extending from the hoist shaft to near an opening in the bumper. A lock attached to the end of the locking shaft extends through the opening in the bumper to prevent removal of the locking shaft. The other end of the locking shaft inserts into the end of the hoist shaft.

One problem with prior art security devices has been that they do not prevent the rotation of the locking shaft. If rotation of the locking shaft is not prevented, a person can use a wrench or a pair of pliers to rotate the locking shaft, and with it the hoist shaft. If the hoist shaft can be rotated, the spare tire can be lowered from its protective position under the bed of the truck, and the purpose of the locking shaft has been defeated.

SUMMARY OF THE INVENTION

The general object of the security device of the invention is to prevent the unauthorized removal of a spare tire mounted on a hoist shaft under the rear of a truck. In particular, the object of the invention is to prevent unauthorized rotation of the hoist shaft. This object is accomplished by a security device having a locking shaft extending from the hoist shaft through a hole in the bumper. A lock attaches to the locking shaft at a point adjacent to the bumper to prevent removal of the locking shaft from the hoist shaft and to prevent rotation of the locking shaft. If the locking shaft is rotated while the lock is in place, the lock will contact the bumper, preventing further rotation of the locking shaft.

The above, as well as additional objects, features, and advantages of the invention will become apparent in the following detailed description.

DESCRIPTION OF THE PREFERRED EMBODIMENT

Figure 1:
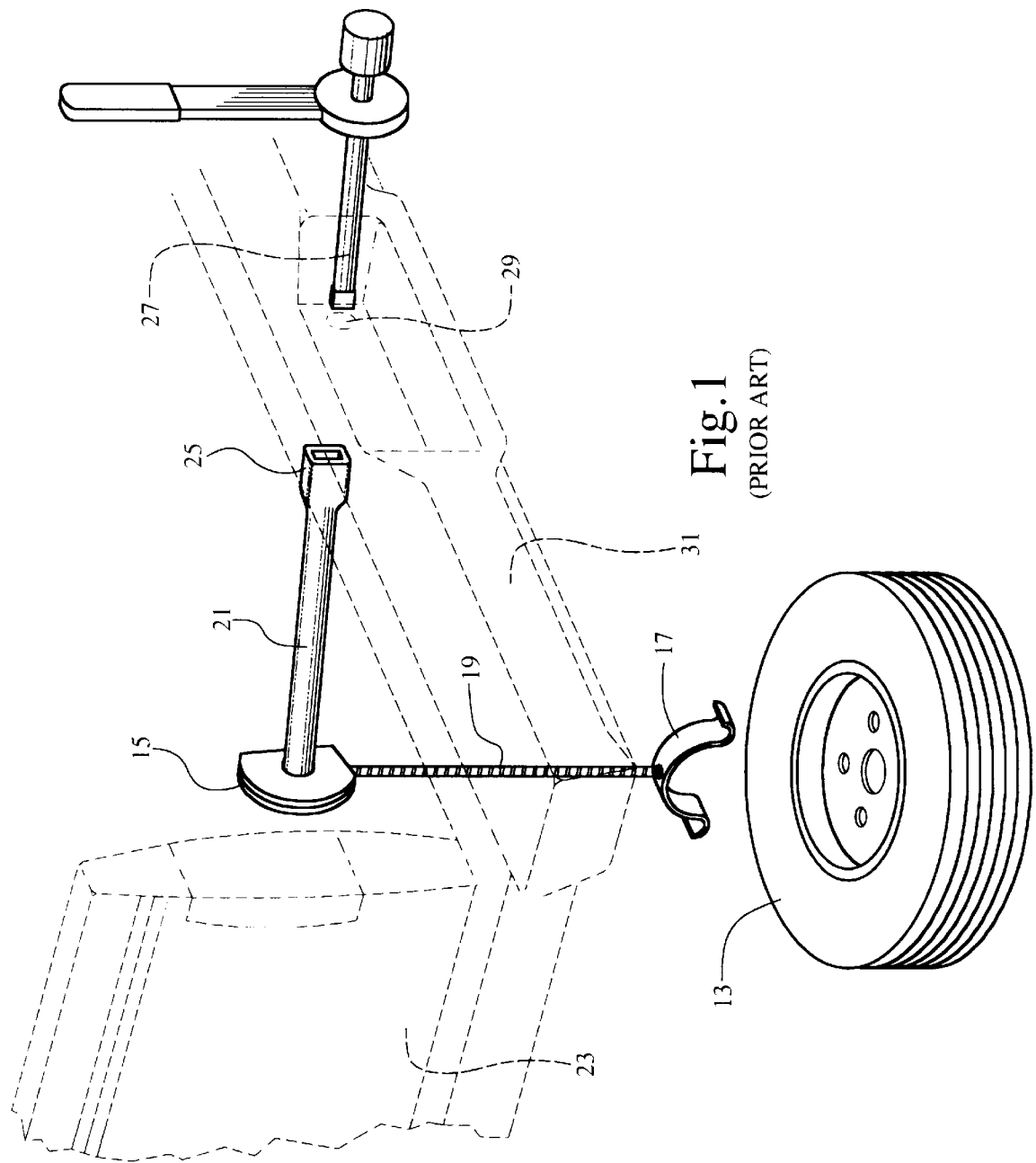
FIG. 1 is a perspective view of the rear end of a truck having a spare tire mounted on a hoist of the type having a hoist shaft accessible through an opening in the rear bumper.

The security device 11 of the invention is designed to secure a spare tire 13 mounted on a hoist 15, as shown in FIG. 1. The tire 13 is suspended from the hoist 15 on a retainer 17 on the lower end of a cable 19.

A hoist shaft 21 extends from the hoist 15 toward the rear of the vehicle 23. The end 25 of the hoist shaft 21 is flared in order to be engaged with a ratchet 27 or another type of crank by inserting the ratchet 27 through an opening 29 in the rear bumper 31 of the vehicle 23. When the end of the hoist shaft 21 is engaged by a ratchet 27, the spare tire 13 can be raised or lowered by turning the hoist shaft 21 with the ratchet 27.

Figure 2:
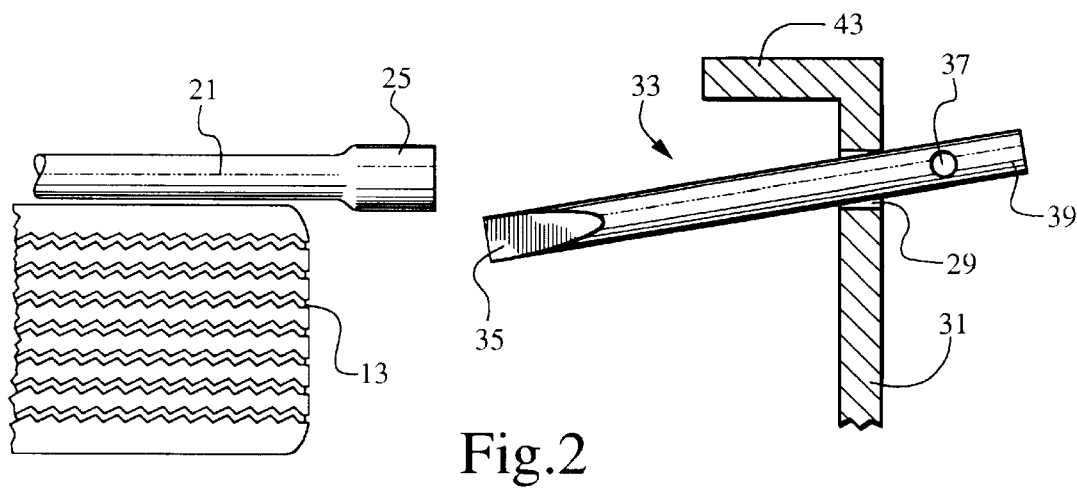
FIG. 2 is a side elevation of the device of the invention being inserted through the opening in the rear bumper during installation the device on the end of the hoist shaft.
Figure 3:
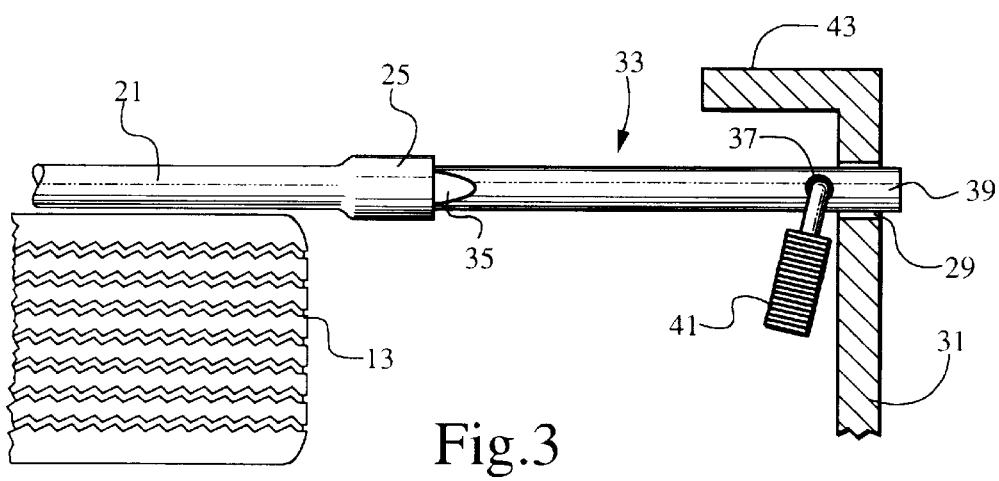
FIG. 3 is a side elevation of the device of the invention installed on the hoist shaft.
Figure 4:
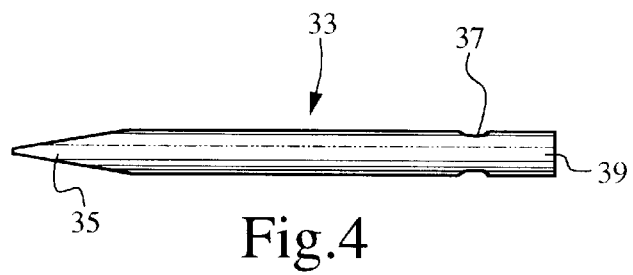
FIG. 4 is a top plan view of the locking shaft of the invention.

The security device 11 of the invention is illustrated in FIGS. 2–4. The device 11 includes a locking shaft 33, which is generally a cylindrical steel rod, having a diameter of about five eighths of an inch (1.6 centimeters). The locking shaft 33 is about eight inches long (20.3 centimeters), so it extends from the end 25 of the hoist shaft 21 through the hole 29 in the bumper 31, as shown in FIG. 3.

The front end 35 of the locking shaft 33 is tapered, so that the end 35 of the shaft 33 will fit snugly in the end 25 of the hoist shaft 21. When the locking shaft 33 is inserted into the hoist shaft 21, neither can be rotated without the other also being rotated.

A hole 37 is drilled through the locking shaft 33 at a point one and one quarter inches (3.2 centimeters) from the rear end 39 of the locking shaft 33. This places the hole 37 adjacent to the bumper 31 when the locking shaft 33 is inserted into the hoist shaft 21, as shown in FIG. 3.

A padlock 41 fits through the hole 37 in the locking shaft 33, so that the padlock 41 is located adjacent to the bumper 31. A combination lock or some other suitable lock may also be used. The padlock 41 secures the locking shaft 33 to the hoist shaft 21, since the locking shaft 33 cannot be pulled out of the hole 29 in the bumper 31 while the padlock 41 is in place.

If the locking shaft 33 is rotated, the padlock 41 will rotate with the locking shaft 33 and contact a lip 43 on the bumper 31. At that point, the padlock 41 will prevent further rotation of the locking shaft 33 and of the hoist shaft 21.

In operation, the locking shaft 33 is installed by inserting the locking shaft through the hole 29 in the bumper 31. The front end 35 of the locking shaft 33 is inserted into the end 25 of the hoist shaft 21. The padlock 41 is then placed through the hole 37 in the locking shaft 33 and locked. At that point, the locking shaft 33 cannot be removed from the hoist shaft 21, and the locking shaft and the hoist shaft 21 cannot be rotated to lower the spare tire 13.

The security device 11 is removed by first removing the padlock 41 from the hole 37 in the locking shaft 33. The locking shaft 33 can then be withdrawn from the end 25 of the hoist shaft 21, and removed through the hole 29 in the bumper 31.

The security device 11 of the invention has several advantages over the prior art. The security device of the invention does not allow the hoist shaft to be rotated, which will lower the spare tire. Also, the security device of the invention is inexpensive and easy to install and to remove.

The invention has been described in only one embodiment. It should be apparent to those skilled in the art that the invention is not so limited, but is susceptible to various changes and modifications without departing from the spirit of the invention.

I claim:

1. A device adapted for securing a spare tire mounted on an existing hoist of a vehicle for which use of said device is contemplated and having a bumper with an offset cross-section and an existing hoist shaft terminating in a socket-like formation at a distal end spaced behind an access opening in the vehicle bumper, the device comprising:

a removable locking shaft positionable for extending unattached between the distal end of the hoist shaft and the bumper of the vehicle with which said device is to be utilized through the access opening in the bumper, wherein the locking shaft comprises an elongated cylindrical bar with a plain distal end and of a diameter throughout the length of the bar that is uniformly smaller than the diameter of the opening in the bumper, so that the locking shaft can pass completely through the opening and when removed renders the hoist shaft of the vehicle capable of being operated;

the opposite end of the locking shaft being insertable into a rotational interlocking engagement with the distal end of the hoist shaft;

a transverse aperture defined in the locking shaft between the distal end of the hoist shaft and an interior surface of the bumper in close proximity to the offset cross-section of the bumper; and a lock for attachment through the aperture of the locking shaft for said lock and locking shaft to afford a limited arcuate displacement from a standing relation until said lock incurs a rotational interference relation with respect to the offset cross-section of the bumper whereby to prevent removal of the locking shaft from the hoist shaft and to prevent further rotation of the locking shaft.

2. A device for securing a spare tire, as recited in claim 1, wherein the lock when arcuately displaced engages a lip on the offset cross-section of bumper to prevent rotation of the locking shaft.

3. A device for securing a spare tire, as recited in claim 2, wherein the lock is a padlock for insertion through the aperture of the locking shaft.

4. A device for securing a spare tire, as recited in claim 3, wherein the said opposite end of the locking shaft is wedge-shaped.

5. A device adapted for securing a spare tire mounted on an existing hoist of a vehicle for which use of said device is contemplated having a bumper with an inwardly overhanging lip and an existing hoist shaft terminating in a socket-like formation at a distal end spaced behind an access opening in the vehicle bumper located below said inwardly overhanging lip, wherein the device comprises:

a removable elongated locking shaft of substantially uniform dimension throughout the length of the locking shaft so as to be positionable for extending unattached between the distal end of the hoist shaft and the bumper of the vehicle with which said device is to be utilized through the access opening in the bumper and which when removed renders the hoist shaft of the vehicle capable of being operated;

an edge on one end of the locking shaft being insertable into the distal end of the hoist shaft for a rotational interlock therewith, wherein the edge is formed by the convergence of two planar surfaces; and a lock for attachment to the locking shaft at a location adjacent to an interior surface of the bumper for said lock and locking shaft to afford a limited arcuate displacement from a standing relation until said lock incurs a rotational interference relation with respect to the overhanging bumper lip whereby to prevent removal of the locking shaft from the hoist shaft and to prevent further rotation of the locking shaft.

6. A device for securing a spare tire, as recited in claim 5, wherein the lock when arcuately displaced engages the lip on the bumper to prevent rotation of the locking shaft.

7. A device for securing a spare, tire, as recited in claim 6, wherein the locking shaft includes a transverse aperture between the distal end of the hoist shaft and the bumper in close proximity to the bumper lip and the lock is a padlock for insertion through the aperture of the locking shaft.

8. A device for securing a spare tire, as recited in claim 7, wherein the edge on the locking shaft is wedge-shaped.

* * * * *